(12) United States Patent
Tschirschke

(10) Patent No.: US 9,850,810 B2
(45) Date of Patent: Dec. 26, 2017

(54) EXHAUST-GAS TURBOCHARGER

(71) Applicant: BorgWarner Inc., Auburn Hills, MI (US)

(72) Inventor: Juergen Tschirschke, Hettenleidelheim (DE)

(73) Assignee: BorgWarner Inc., Auburn Hills, MI (US)

( * ) Notice: Subject to any disclaimer, the term of this patent is extended or adjusted under 35 U.S.C. 154(b) by 370 days.

(21) Appl. No.: 14/358,302

(22) PCT Filed: Nov. 19, 2012

(86) PCT No.: PCT/US2012/065795
§ 371 (c)(1),
(2) Date: May 15, 2014

(87) PCT Pub. No.: WO2013/078115
PCT Pub. Date: May 30, 2013

(65) Prior Publication Data
US 2014/0322006 A1    Oct. 30, 2014

(30) Foreign Application Priority Data

Nov. 23, 2011    (DE) .......................... 10 2011 119 363

(51) Int. Cl.
F03D 11/00    (2006.01)
F02B 37/00    (2006.01)
(Continued)

(52) U.S. Cl.
CPC .............. *F02B 37/00* (2013.01); *F01D 5/025* (2013.01); *F02B 39/16* (2013.01); *F05D 2220/40* (2013.01); *F05D 2240/581* (2013.01); *F05D 2250/131* (2013.01); *F05D 2260/36* (2013.01); *F05D 2300/174* (2013.01)

(58) Field of Classification Search
CPC .......... F02B 37/00; F02B 39/16; F01D 5/025; F05D 2220/40; F05D 2240/581; F05D 2240/131; F05D 2250/131; F05D 2260/36; F05D 2300/174; F05D 2260/37; F05D 2300/133
USPC ........................ 415/216.1, 208.1; 416/204 A
See application file for complete search history.

(56) References Cited

U.S. PATENT DOCUMENTS 2,668,006 A * 2/1954 Larrecq .................... F02C 6/12
                                                    415/143
4,490,622 A   12/1984 Osborn
(Continued)

FOREIGN PATENT DOCUMENTS

JP    03260330 A    11/1991
JP    2007071177 A    3/2007
(Continued)

OTHER PUBLICATIONS

International Search Report and Written Opinion dated Mar. 27, 2013, in International Application No. PCT/US2012/065795.

*Primary Examiner* — Laert Dounis
*Assistant Examiner* — Kelsey Stanek
(74) *Attorney, Agent, or Firm* — Eric L. Doyle; Stephan A. Pendorf; Patent Central LLC

(57) ABSTRACT

An exhaust-gas turbocharger (1) with a compressor wheel (2); with a turbine wheel (3); and with a shaft (4) on which the compressor wheel (2) and the turbine wheel (3) are arranged in a rotationally secured manner. The turbine wheel (3) has a through-opening (5) in which a first end region (6) of the shaft (4) is arranged, and the turbine wheel (3) is braced between an end-side stop (7) connected to the end region (6) and a compressor wheel-side shaft sleeve (8) fixed on the shaft (4).

10 Claims, 1 Drawing Sheet

(51) Int. Cl.
*F01D 5/02* (2006.01)
*F02B 39/16* (2006.01)

(56) References Cited

U.S. PATENT DOCUMENTS

| | | | |
|---|---|---|---|
| 6,305,169 B1 | 10/2001 | Mallof | |
| 6,364,634 B1 * | 4/2002 | Svihla | F01D 5/025 417/409 |
| 2007/0033937 A1 * | 2/2007 | Baur | F01D 5/02 60/605.1 |
| 2007/0186551 A1 * | 8/2007 | Ante | F01D 17/06 60/605.1 |
| 2007/0292268 A1 * | 12/2007 | Nishiyama | F01D 5/025 415/208.3 |
| 2010/0047072 A1 * | 2/2010 | Holzschuh | F01D 5/025 416/204 R |
| 2010/0054944 A1 * | 3/2010 | Fledersbacher | F01D 5/025 416/204 A |
| 2011/0038717 A1 * | 2/2011 | Lee | F01D 25/22 415/170.1 |
| 2011/0091324 A1 * | 4/2011 | Holzschuh | B23P 15/006 416/200 A |

FOREIGN PATENT DOCUMENTS

| | | |
|---|---|---|
| JP | 2011137379 A | 7/2011 |
| WO | 2009131269 A1 | 10/2009 |

\* cited by examiner

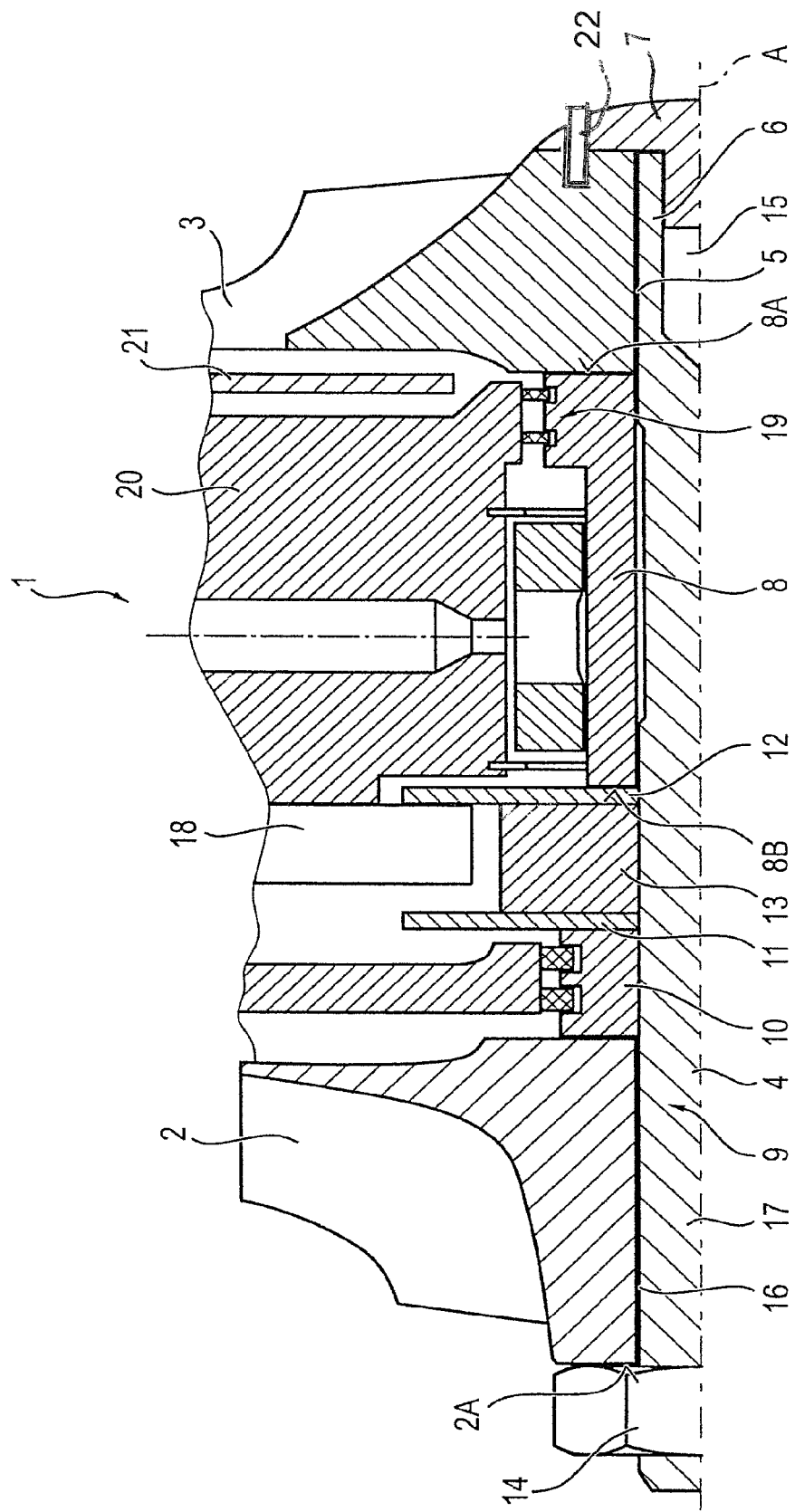

EXHAUST-GAS TURBOCHARGER

BACKGROUND OF THE INVENTION

Field of the Invention

The invention relates to an exhaust-gas turbocharger.

Description of the Related Art

In the case of an exhaust-gas turbocharger of the generic type, the turbine wheel is brazed or welded to the shaft, possibly causing problems under certain circumstances during mounting owing to thermal distortion and moreover being relatively complicated.

It is therefore the object of the present invention to provide an exhaust-gas turbocharger of the type specified in the preamble of claim 1 in which the turbine wheel can be securely connected to the shaft in a technically simple manner without a material bond.

BRIEF SUMMARY OF THE INVENTION

This object is achieved by the features of claim 1.

According to the invention, the turbine wheel, in particular in the form of a TiAl turbine wheel, is provided with a through-opening or through-bore and can accordingly be pushed onto the shaft up to a stop fixed on the shaft. A shaft sleeve can then be slid onto the shaft, by means of which the turbine wheel can be securely fixed on the shaft in a different manner.

Here, one end side of the shaft sleeve serves as an abutment on the turbine wheel and the other end side of the sleeve functions as a shaft shoulder for a shaft assembly arranged on the shaft. The large length of this shaft assembly makes it possible to achieve a good tension rod effect.

Consequently, the arrangement according to the invention of the exhaust-gas turbocharger requires neither a brazing nor a welding operation.

In addition to the advantages already mentioned above, there results the advantage that the rotor formed by the shaft assembly and the shaft can be machined if required after mounting the shaft sleeve.

Furthermore, the arrangement according to the invention allows the production of a heat throttle and there results a simple handling of the entire arrangement during its mounting.

There further results the advantage that the dimensions of the exhaust-gas turbocharger or of its rotor are not changed, with the result that the rotor according to the invention can be mounted in existing model ranges.

The subclaims contain advantageous developments of the invention.

BRIEF DESCRIPTION OF THE SEVERAL VIEWS OF THE DRAWINGS

Further details, advantages and features of the present invention will become apparent from the following description of an exemplary embodiment with reference to the drawing.

FIG. 1 shows a section through a turbocharger with turbine wheel secured by a press-fit end-stop.

DETAILED DESCRIPTION OF THE INVENTION

Here, the single FIGURE of the drawing shows a longitudinal section through an exhaust-gas turbocharger according to the invention, and, to simplify the illustration, only half of the components of the exhaust-gas turbocharger arranged above the turbocharger axis A are illustrated without compressor and turbine housings.

Accordingly, the exhaust-gas turbocharger 1 has a compressor wheel 2 and a turbine wheel 3 which are each arranged in a rotationally secured manner on a shaft 4.

According to the invention, to avoid the need for a brazed or welded connection, the turbine wheel 3 has a through-opening 5. By pushing the turbine wheel 3 onto the shaft 4, a first end region 6 of the shaft 4 is arranged inside the through-opening 5.

The FIGURE further shows that the turbine wheel 3 is arranged between a non-threaded end-side stop 7 permanently fixed on the end region 6 and a shaft sleeve 8 which is arranged on the shaft 4 on the compressor wheel side.

To secure against rotation, the turbine wheel 3 can be provided, for example, with a polygon arrangement (not shown in further detail in the FIGURE) which provides complementary polygon shapes in the through-opening 5 and on the end region 6 of the shaft 4. Alternatively, there could be provided an end-side positive-locking device, for example in the form of a pin-hole arrangement in which retaining pins 22, of which only one is shown in FIG. 1, are provided either in an end of the turbine wheel 3 or the adjacent side of the end stop 7 and pin-holes in which the pins of the pin arrangement engage are provided in the respective other part.

In order to brace the turbine wheel 3, different possibilities according to the principles of the present invention are provided.

One alternative is screwing the shaft sleeve 8 on the shaft 4 or pressing the shaft sleeve 8 by means of a press fit on the shaft 4. With this option, the turbine wheel 3 is braced between the stop 7 and an end face 8A of the shaft sleeve 8. In this case, the other end side or end face 8B of the shaft sleeve 8 forms a shaft shoulder for a shaft assembly 9 which, in the case of the example illustrated, comprises the compressor wheel 2, a sealing bush 10 adjoining the latter in the direction of the turbine wheel 3, a bearing collar 11 adjoining the latter, a bush 13 in turn adjoining the latter and a bearing collar 12 which in turn adjoins the latter and which in the final mounting state bears against the end face 8B, as is evident in detail from the FIGURE.

As an alternative to the aforementioned bracing of the turbine wheel 3 on the shaft 4, it is possible for the shaft sleeve 8 to be applied loosely to the shaft 4 and braced via the aforementioned shaft assembly 9. For this purpose, a shaft nut 14 can be provided which bears against an outwardly directed end face 2A of the compressor wheel 2 and can thus brace the turbine wheel 3 via the compressor wheel 2 and the aforementioned shaft assembly 9 and also the shaft sleeve 8 applied loosely on the shaft 4. Particularly with this arrangement there is also a very good tension rod effect and hence a very secure bracing both of the turbine wheel 3 and the compressor wheel 2 which likewise has a through-opening 16 such that it can also be pushed onto the shaft 4.

In addition to the aforementioned advantages of simplified mounting and avoidance of a material bond, the aforementioned design according to the invention of the exhaust-gas turbocharger 1 affords the possibility of providing a heat throttle 15 in the end region 6 of the shaft 4.

The above-described embodiment is particularly advantageous if the material of the compressor wheel 3 is titanium aluminide.

In addition to the written disclosure above, reference is hereby explicitly made, to supplement the disclosure of the invention, to the graphic representation of the single FIGURE.

LIST OF REFERENCE SIGNS

1 Exhaust-gas turbocharger
2 Compressor wheel
2A Outer end face of the compressor wheel 2
3 Turbine wheel
4 Shaft
5 Through-opening
6 First end region of the shaft 4
7 Stop
8 Shaft sleeve
8A, 8B End faces or end sides of the shaft sleeve
9 Shaft assembly
10 Sealing bush
11, 12 Bearing collars
13 Bush between the bearing collars
14 Shaft nut
15 Heat throttle
16 Through-opening of the compressor wheel 2
17 Second end region of the shaft 4
18 Axial bearing arrangement
19 Sealing bush portion of the shaft sleeve 8
20 Bearing housing
21 Heat shield
A Turbocharger axis

The invention claimed is:

1. An oil-lubricated exhaust-gas turbocharger (1) with
a compressor wheel (2);
a turbine wheel (3); and
a shaft (4) on which the compressor wheel (2) and the turbine wheel (3) are arranged in a rotationally secured manner, wherein
the shaft has a first end to which an end-stop (7) is fixed,
the turbine wheel (3) has a bore (5) in which a first end region (6) of the shaft (4) is arranged,
the turbine wheel (3) is axially secured on the shaft (4) between the stop (7) and a compressor wheel-side shaft sleeve (8), and
the turbine wheel (3) is rotationally secured by an end-side positive-locking device which cooperates with the stop (7).

2. The exhaust-gas turbocharger as claimed in claim 1, wherein the shaft sleeve (8) is screwed onto the shaft (4).

3. The exhaust-gas turbocharger as claimed in claim 1, wherein the shaft sleeve (8) is pressed on the shaft (4) by a press fit.

4. The exhaust-gas turbocharger as claimed in claim 1, wherein the shaft sleeve (8) is arranged loosely on the shaft (4) and is braced via a shaft assembly (9).

5. The exhaust-gas turbocharger as claimed in claim 4, wherein the shaft assembly (9) comprises the compressor wheel (2) and an arrangement which is arranged between the compressor wheel (2) and the shaft sleeve (8) on the shaft (4) and which consists of a sealing bush (10), two bearing collars (11, 12) and a bush (13) arranged between the bearing collars (11, 12), and, for bracing purposes, a shaft nut (14) which bears on the outer side of the compressor wheel (2) and is screwed onto the shaft (4) is provided.

6. The exhaust-gas turbocharger as claimed in claim 1, wherein a heat throttle (15) is provided in the first end region (6) of the shaft (4).

7. The exhaust-gas turbocharger as claimed in claim 1, wherein the material of the turbine wheel (3) is thallium aluminide.

8. The exhaust-gas turbocharger as claimed in claim 1, wherein the compressor wheel (2) has a through-opening (16) for receiving a second end region (17) of the shaft (4).

9. The exhaust-gas turbocharger as claimed in claim 1, wherein the end-side positive-locking device comprises retaining pins (22) provided in one of (a) the end of the turbine wheel (3) and (b) the adjacent side of the end-stop (7), and wherein pin-holes in which the retaining pins (22) engage are provided in the other of (a) the end of the turbine wheel (3) and (b) the adjacent side of the end-stop (7).

10. A method for assembling an oil-lubricated exhaust-gas turbocharger (1), comprising
providing a shaft (4) having a turbine end and a compressor end;
fixing an end-stop (7) to the turbine end of the shaft (4);
sliding a turbine wheel (3) onto the shaft (4) until the turbine wheel (3) abuts against the end-stop (7) and is rotationally secured by an end-side positive-locking device;
sliding a shaft sleeve (8) onto the shaft (4) until it abuts against the turbine wheel (3);
sliding a compressor wheel (2) onto the shaft (4), and
screwing a shaft nut (14) onto the shaft (4) until it bears against the compressor wheel (2);
wherein the turbine wheel is axially secured between the end-stop (7) and the shaft sleeve (8), wherein the shaft sleeve (8) is fixed:
via a press-fit connection,
via a pin-and-pinhole arrangement, or
by sliding onto the shaft (4) an arrangement comprising a sealing bush (10), two bearing collars (11, 12) and a bush (13) arranged between the bearing collars (11, 12), and pressing these against the shaft sleeve (8) by a compressor wheel and nut arrangement.

* * * * *